United States Patent
Letay et al.

(10) Patent No.: US 8,939,398 B2
(45) Date of Patent: Jan. 27, 2015

(54) HINGING CRADLE FOR FAN COWLS SUPPORTED BY SAID COWLS IN CLOSED POSITION

(75) Inventors: Benoit Letay, Bouloc (FR); Andrés Toro, Leguevin (FR); Adrien Venet, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 82 days.

(21) Appl. No.: 13/558,033

(22) Filed: Jul. 25, 2012

(65) Prior Publication Data
US 2013/0161446 A1 Jun. 27, 2013

(30) Foreign Application Priority Data
Aug. 3, 2011 (FR) .................... 11 57129

(51) Int. Cl.
B64D 29/06 (2006.01)
B64D 27/26 (2006.01)
F02C 7/20 (2006.01)

(52) U.S. Cl.
CPC . B64D 27/26 (2013.01); F02C 7/20 (2013.01); B64D 29/06 (2013.01); B64D 2027/264 (2013.01)
USPC .......................................... 244/54; 244/53 B

(58) Field of Classification Search
USPC .................. 244/53 R, 54, 53 B, 129.4, 129.5; 60/226.2, 796, 797; 248/554
See application file for complete search history.

(56) References Cited

U.S. PATENT DOCUMENTS

| | | | |
|---|---|---|---|
| 7,100,869 B2 * | 9/2006 | Picard et al. ..................... | 244/54 |
| 7,296,768 B2 * | 11/2007 | Machado et al. ................ | 244/54 |
| 8,162,254 B2 * | 4/2012 | Roche .............................. | 244/54 |
| 2008/0156930 A1 * | 7/2008 | Audart-Noel et al. .......... | 244/54 |
| 2009/0266932 A1 * | 10/2009 | Roche et al. .................... | 244/54 |
| 2011/0127369 A1 | 6/2011 | Dussol et al. | |
| 2012/0056033 A1 * | 3/2012 | Teulou et al. ................... | 244/54 |
| 2012/0168558 A1 * | 7/2012 | Journade et al. ................ | 244/54 |
| 2012/0175462 A1 * | 7/2012 | Journade et al. ................ | 244/54 |

FOREIGN PATENT DOCUMENTS

| | | |
|---|---|---|
| FR | 2920409 | 3/2009 |
| WO | WO 2008-006826 | 1/2008 |

OTHER PUBLICATIONS

International Search Report and Written Opinion for Serial No. FR 1157129 dated Mar. 12, 2012.

* cited by examiner

*Primary Examiner* — Timothy D Collins
*Assistant Examiner* — Jamie S Stehle
(74) *Attorney, Agent, or Firm* — Jenkins, Wilson, Taylor & Hunt, P.A.

(57) ABSTRACT

The invention relates to an engine assembly for aircraft in which the coupling device comprises a fore aerodynamic structure having a cradle equipped with an aerodynamic cowling, the cradle being hinge mounted on the air intake of the engine, and the fan cowls being mounted to move on the cradle so as to be able to occupy an open position as well as a closed position in which they are supported by the air intake and by a thrust reverser. According to the invention, when the cowls are in open position, the cradle adopts a first configuration in which its aft end rests on a span of the engine mounting structure, and when the cowls are in closed position, the cradle, borne by said cowls, adopts a second configuration in which it is lacking any direct mechanical link with the other elements of the engine mounting structure.

10 Claims, 6 Drawing Sheets

HINGING CRADLE FOR FAN COWLS SUPPORTED BY SAID COWLS IN CLOSED POSITION

CROSS-REFERENCE TO RELATED APPLICATIONS

This application claims priority to French Patent Application No. 11 57129 filed Aug. 3, 2011, the entire disclosure of which is herein incorporated by reference.

TECHNICAL FIELD

The present invention relates to an engine assembly for aircraft comprising an engine, a coupling device of the engine as well as a nacelle surrounding the engine and provided with fan cowls as well as an air intake, the aforementioned coupling device comprising a rigid structure as well as a fore aerodynamic structure on which the fan cowls are mounted to move, preferably in a hinged manner.

This type of coupling device, also called engine mounting structure or EMS, makes it possible on the whole to suspend an engine such as a turbojet engine below the wing of the aircraft, or instead to mount said engine above said same wing, or even to assemble said engine on an aft fuselage part of the aircraft.

PRIOR ART

Such a coupling device is in fact provided to constitute the connecting interface between an engine and a wing of the aircraft. It makes it possible to transmit to the structure of said aircraft the stresses generated by its associated engine, and also allows the routing of the fuel, electric, hydraulic, and air systems between the engine and the aircraft.

In order to assure the transmission of stresses, the coupling device comprises a rigid structure also designated primary structure, often of the "caisson" type, in other words formed by the assembly of upper and lower longerons and lateral panels connected together through the intermediary of transversal ribs.

Furthermore, the coupling device is provided with coupling means interposed between the engine and the rigid structure, said means comprising overall two engine mounts, as well as a device for taking up the thrust stresses generated by the engine. In the prior art, said take up device normally comprises two lateral connecting rods connected on the one hand to a housing of the engine such as the fan housing or the intermediate housing, and on the other hand to an aft or fore engine mount fixed on the central housing or on the ejection housing of the latter.

In the same way, the coupling device also comprises another series of mounts constituting a mounting system interposed between the rigid structure and the wing of the aircraft, said system being normally composed of two or three mounts.

Moreover, the engine mounting structure is provided with a plurality of secondary structures assuring in particular the segregation and the maintenance of the systems while supporting aerodynamic fairing elements, the latter generally taking the form of panels or cowlings incorporated in said same structures. In a manner known to those skilled in the art, the secondary structures differ from the rigid structure, also designated primary structure, by the fact that they are not intended to assure the transfer of stresses coming from the engine and which have to be transmitted to the wing of the aircraft.

Among the secondary structures is included a fore aerodynamic structure situated at the fore of the rigid structure of the engine mounting structure, said fore aerodynamic structure having not only an aerodynamic fairing function, but also enabling the installation, the segregation and the routing of different systems (air, electrics, hydraulics, fuel). In addition, said fore aerodynamic structure bears the fan cowls of the nacelle, whereas the thrust reverser cowls are for their part generally borne by the rigid structure of the engine mounting structure.

In the solutions of the prior art, particularly that known from the document FR 2 920 409, the fore aerodynamic structure generally comprises a cradle covered with an aerodynamic cowling, mounted in a fixed manner on the latter or formed from a single part with it. The aerodynamic cowling, also known as panel or aerodynamic fairing element, thus covers the cradle, fulfilling for its part a structural role of support of the fan cowls.

The aforementioned cradle is then mounted on the rigid structure using appropriate coupling means. Other coupling means assure the mounting of its fore end on the air intake or on the fan housing of the engine.

Furthermore, when the fan cowls are in closed position, they are supported at the fore end thereof by the air intake or the fan housing, and supported at the aft end thereof by the thrust reverser system equipping the engine. In addition, they are normally locked to each other, which places them in a configuration with a high degree of hyperstaticity.

Consequently, when the engine assembly is subjected to important stresses such as are encountered during take-off and landing phases, or instead in flight during strong turbulences, the relative displacements between the engine and the engine mounting structure to which is mounted the cradle leads to a substantial modification of the overall geometry of the assembly, and more specifically that of the fan cowls of the nacelle.

The deformation of the fan cowls and air scoops causes misalignments that obviously degrade the overall aerodynamic performances of the aircraft.

DESCRIPTION OF THE INVENTION

The aim of the invention is thus to propose an engine assembly for aircraft overcoming the aforementioned drawbacks, relative to the embodiments of the prior art.

To do this, the invention relates to an engine assembly for aircraft comprising an engine, a coupling device of the engine as well as a nacelle surrounding the engine and provided with fan cowls as well as an air intake, said coupling device comprising a rigid structure as well as a fore aerodynamic structure, the latter having a cradle equipped with an aerodynamic cowling, said cradle being hinge mounted at its fore end on an entity comprising a fan housing of said engine as well as the air intake, and said fan cowls being mounted to move on said cradle so as to be able to occupy an open position as well as a closed position in which they are supported at the fore by said entity and at the aft by a thrust reverser system.

According to the invention, the assembly is designed such that when the fan cowls are in open position, said cradle adopts a first configuration in which its aft end is retained by a span of the engine mounting structure, and such that when the fan cowls are in closed position, said cradle, borne by the fan cowls, adopts a second configuration in which it is lacking any direct mechanical link with the other elements of the engine mounting structure.

Consequently, the invention cleverly provides, when the cowls are in closed position, for mechanically decoupling the cradle from the remainder of the engine mounting structure. This reduces the degree of hyperstaticity of the fan cowls, in which the subsistent deformations, notably due to aerodynamic pressures, may be accompanied by the fore aerodynamic structure, and in particular by its cradle. In this state, each cowl is thus supported at the fore by the entity and at the aft by the thrust reverser system, and bears the cradle which is moreover maintained by the hinge connecting it to the entity. On the other hand, as mentioned above, there is no longer any direct mechanical link between said cradle and the remainder of the engine mounting structure situated at the aft thereof, which enables said cradle to easily accompany the deformation of the fan cowls, without further constraining the latter.

Thus, in flight, the nominal geometry of the nacelle is better respected, in particular that of its fan cowls, and the aerodynamic performances of the engine assembly are consequently enhanced.

Then, when the fan cowls are in open position, as is the case for example during ground maintenance operations, the cradle adopts a configuration in which its aft end is retained by a specific span of the engine mounting structure, for example resting simply thereon, by gravity. Said specific span of the engine mounting structure is for example constituted by a fore extension of the secondary structure thereof. The cowls are then in turn supported by the cradle, and not the reverse as is the case in the second configuration of the cradle, adopted when the cowls are in closed position.

The displacement from the second configuration to the first configuration takes place preferably by gravity, during the opening of the fan cowls. Thus, it is preferable that the cradle is hinge mounted at its fore end on the entity, along a hinge axis parallel to a transversal direction of the assembly. Moreover, during said displacement, it is provided that said cradle is pivoted by an angle comprised between 0.5 and 5° between its first and its second configuration, around its hinge with said entity.

Preferably, said span of the engine mounting structure is integral with a secondary structure of said engine mounting structure, but could be any other element of the engine mounting structure capable of withstanding the stresses encountered when the cradle adopts its first support configuration.

Preferably, said cradle is hinge mounted at its fore end on the air intake of said entity, but could alternatively be hinge mounted on the fan housing, without going beyond the scope of the invention.

Preferably, said cradle and the aerodynamic cowling are formed from a single part, but could alternatively be fixed together.

Preferably, in said second configuration, said aerodynamic cowling of the fore structure is situated in the aerodynamic extension of another aerodynamic cowling of the engine mounting structure, preferentially that from which extends said retaining span of the cradle.

Finally, each fan cowl is hinge mounted on said cradle, by means preferentially of at least two hinges.

The invention also relates to an aircraft comprising at least one engine assembly as that described above, of said aircraft.

Other advantages and characteristics of the invention will become clearer on reading the non limiting detailed description below.

BRIEF DESCRIPTION OF DRAWINGS

This description will be made with reference to the appended drawings, among which.

DETAILED DESCRIPTION OF PREFERRED EMBODIMENTS

Figure 1:
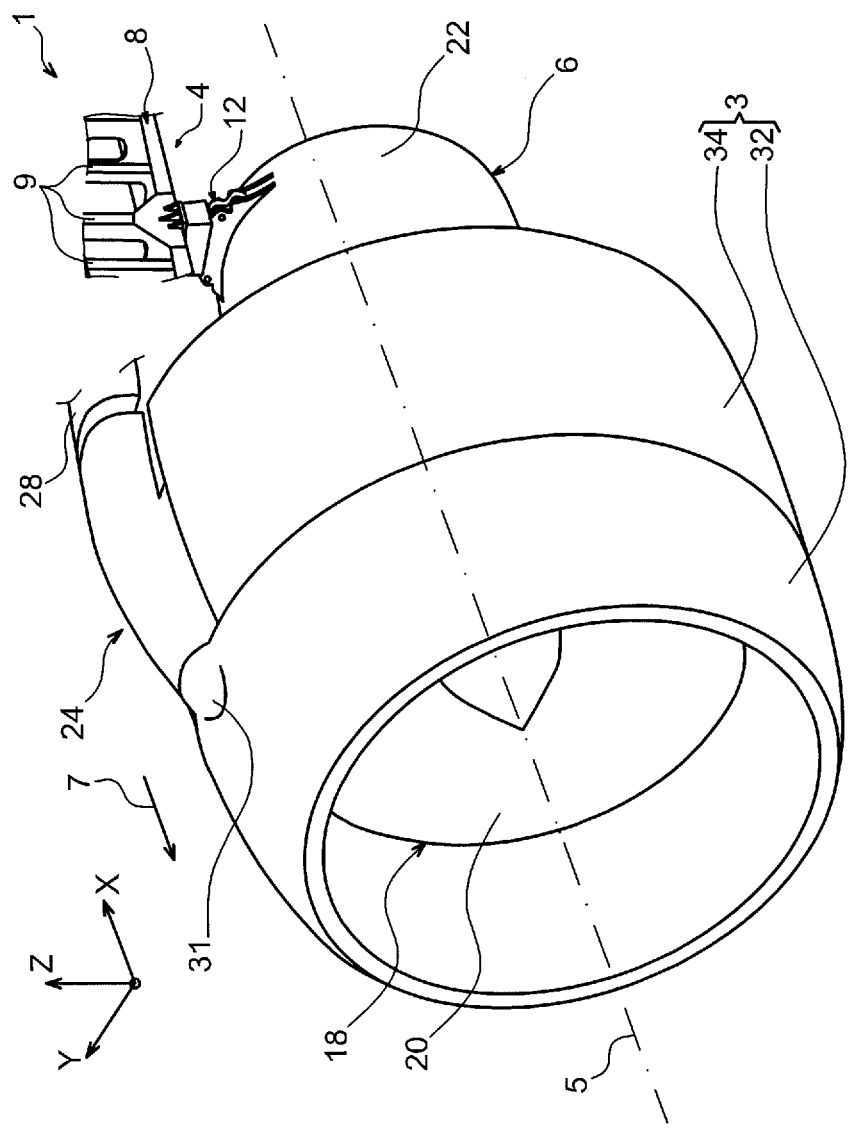
FIG. 1 represents a partial perspective view of an engine assembly for aircraft, according to a preferred embodiment of the present invention.
Figure 2:
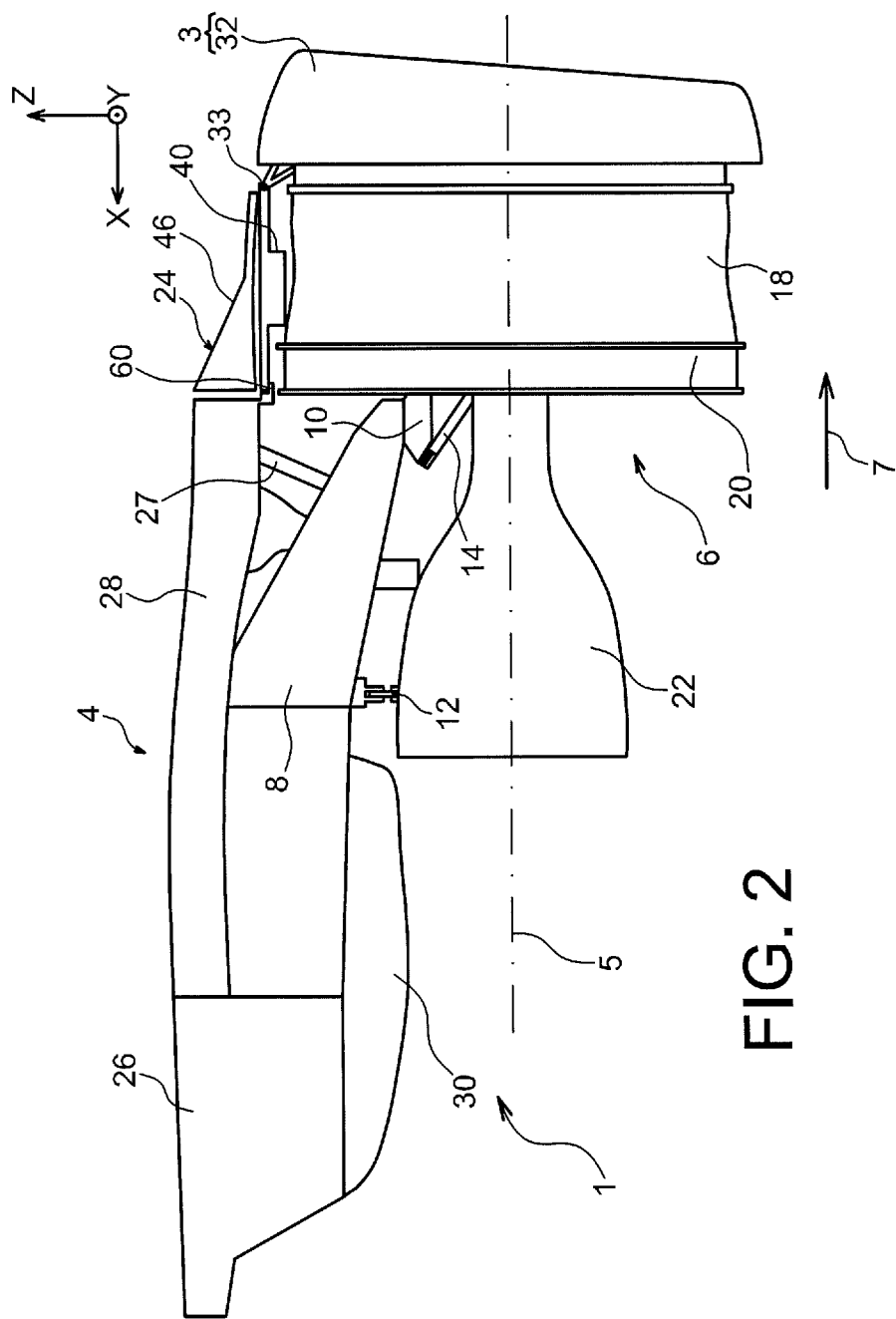
FIG. 2 represents a partial schematic side view of the engine assembly shown in FIG. 1.

With reference firstly to FIGS. 1 and 2, an engine assembly 1 for aircraft is shown intended to be fixed under a wing of said aircraft (not represented), said assembly 1 comprising a coupling device 4, an engine 6 such as a turbojet engine coupled under said device 4, and a nacelle 3, of which only the fore part has been represented in FIG. 1.

In all the description that follows, by convention, X designates the longitudinal direction of the device 4, which can also be assimilated to the longitudinal direction of the turbojet engine 6, said direction X being parallel to a longitudinal axis 5 of said turbojet engine 6. Furthermore, Y designates the direction oriented transversally with respect to the device 4 and which can also be assimilated to the transversal direction of the turbojet engine 6, and Z the vertical direction or the height, said three directions X, Y and Z being orthogonal to each other.

Furthermore, the terms "fore" and "aft" are to be considered with respect to a direction of forward movement of the aircraft encountered following the thrust exerted by the turbojet engine 6, said direction being represented schematically by the arrow 7.

Overall, the coupling device 4 comprises a rigid structure 8, also called primary structure, bearing coupling means of the engine 6, said coupling means having a plurality of engine mounts 10, 12, as well as a device for taking up the thrust stresses 14 generated by the engine 6.

As an indication, it should be noted that the coupling device 4 comprises another series of mounts (not represented) added onto the rigid structure 8 and making it possible to assure the suspension of said assembly 1 under the wing of the aircraft.

In addition, the coupling device 4 comprises a plurality of secondary structures added onto the rigid structure 8. Said secondary structures, assuring the segregation and the maintaining of systems while supporting aerodynamic fairing elements, will be described hereafter.

It is indicated that the turbojet engine 6 has at the fore a fan housing 18 of large dimensions delimiting an annular fan duct 20, and comprises towards the aft a central housing 22 of smaller dimensions, enclosing the core of said turbojet engine. The housings 18 and 22 are obviously integral with each other, and have a junction normally designated intermediate housing. Finally, it is pointed out that the central housing 22 extends towards the aft by a housing know as ejection housing (not referenced).

The engine mounts 10, 12 of the device 4 are provided two in number, and respectively designate fore engine mount and aft engine mount. The fore engine mount 10 is preferentially interposed between a fore part of the rigid structure 8, and the intermediate housing radially linking the housings 18 and 22. Said fore engine mount 10 is designed in a conventional manner and known to those skilled in the art, for example provided to take up the stresses exerted in the three directions X, Y and Z.

Furthermore, the aft engine mount 12, also formed in a conventional manner and known to those skilled in the art and which can be designed to take up the stresses exerted in the directions Y and Z, is for its part interposed between a part more aft of the rigid structure 8, and the central housing 22 or the ejection housing.

The device 14 for taking up the thrust stresses generated by the engine may for its part have a conventional shape of double connecting rods each arranged on one side of the engine 6, the fore end of each connecting rod being mounted on an aft part of the fan housing or the intermediate housing, and the aft end being added onto the fore engine mount 10 or onto the rigid structure 8 near to the latter. This solution is known as "short connecting rods". Nevertheless, a solution known as "long connecting rods" may also be envisaged, in which the aft end of said connecting rods is added onto the aft engine mount 12 or onto the rigid structure 8 near to the latter.

In this preferred embodiment of the present invention, the rigid structure 8 takes the form of a caisson extending from the fore to the aft, substantially along the direction X.

The caisson 8, best represented in FIG. 1, then takes the form of an engine mounting structure of design similar to that normally observed for engine mounting structures for coupling turbojet engines, particularly in the sense that it is provided with transversal ribs 9 each taking the form of a rectangle oriented in a plane YZ.

With reference more specifically to FIG. 2, there is included among the secondary structures of the engine mounting structure 4 a fore aerodynamic structure 24, an aft aerodynamic structure 26, a fillet 28 of the fore and aft aerodynamic structures, and a lower aft aerodynamic fairing 30.

Overall, said secondary structures are conventional elements identical or similar to those encountered in the prior art, and known to those skilled in the art, with the exception of the fore aerodynamic structure 24, which will be described in detail hereafter.

More precisely, the fore aerodynamic structure 24, which is the only structure to have been represented in FIG. 1 for reasons of clarity, is normally placed at the fore of the wing, in a position largely raised with respect to the primary structure 8 to which it is not fixed directly. It has a function of aerodynamic profile between an upper part of the fan cowls hinged thereon, and the leading edge of the wing. Said fore aerodynamic structure 24 then has not only a function of supporting the fan cowls and aerodynamic fairing, but also enables the installation, segregation and routing of different systems (air, electrics, hydraulics, fuel).

Directly in the aft aerodynamic extension of said structure 24, mounted above the rigid structure 8, is situated the fillet 28, also called "Karman". The fore part of the Karman is raised with respect to the rigid structure 8 to which it is fixed by a system of connecting rods 27, whereas the aft part of the Karman hugs the upper longeron of the rigid structure 8, while being fixed to said longeron.

Then, still towards the aft, the fillet 28 is extended by the aft aerodynamic structure 26, which contains the major part of the hydraulic equipment. Said structure 26 is preferably situated entirely aft with respect to the rigid structure 8, and is thus attached under the wing of the aircraft.

Finally, under the rigid structure 8 and the aft aerodynamic structure 26 is situated the lower aft aerodynamic fairing 30, also known as "shield" or "Aft Pylon Fairing". The essential functions thereof are the formation of a fire barrier, and the formation of an aerodynamic continuity between the outlet of the engine and the engine mounting structure.

With reference now more specifically to FIG. 1, one can see a part of the nacelle 3 comprising at its fore end an air intake 32 fixed to the fore of the fan housing 18, said air intake 32 being directly followed towards the aft by two fan cowls 34 (only one of which is visible on account of the perspective view) each mounted in a hinged manner on the secondary aerodynamic structure 24 discussed above. Although this has not been represented, it should be understood that the nacelle 3 of conventional design comprises towards the aft other elements known to those skilled in the art, such as thrust reverser cowls mounted on the rigid structure 8.

In addition, the air intake 32 optionally has, at the upper aft part thereof, an aerodynamic outgrowth 31 situated in the fore extension of the fore aerodynamic structure 24 of the engine mounting structure. It should in this respect be noted that a solution without outgrowth 31 that could be adopted without going beyond the scope of the invention has moreover been represented in FIG. 2.

Figure 3:
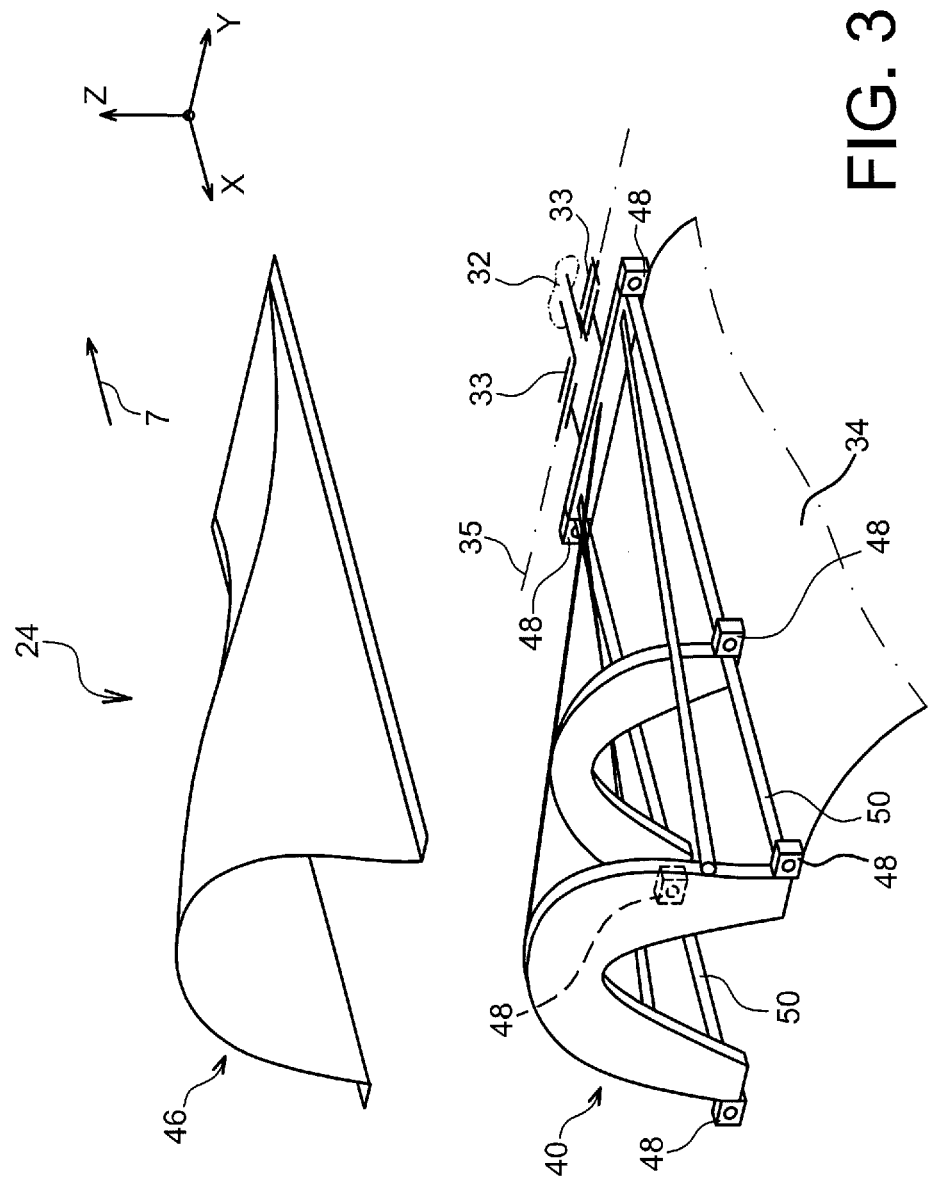
FIG. 3 represents a partial perspective view of the fore aerodynamic structure of the engine assembly shown in the preceding figures.

Reference will now be made to FIG. 3, detailing the fore aerodynamic structure 24.

Said structure 24 has a cradle 40 constituting the structural portion of said element, said element being also known under the designation "cradle". It extends overall above the fan housing 18 (not represented), and is constituted in a conventional manner known to those skilled in the art, namely by the assembly of longerons extending substantially along the direction X and transversal structural elements, of arch frame type opening downwards, for example of substantially semi-cylindrical shape.

To assure the mounting of the cradle 40 on the air intake, its fore end is equipped with one or more hinges 33 connecting it to said air intake, or, as an alternative, to a fore end of the fan housing. In the embodiment represented, two hinges 33 of same axis 35 are provided, parallel to the direction Y. One of the two hinges 33 forms a hinged pivot link, the other a sliding pivot link. The cradle is thus capable of pivoting at its fore end, around the transversal hinge axis 35.

The cradle 40 is covered in a conventional manner by an aerodynamic cowling 46, formed from a single part with the cradle or fixed thereto. The cradle is moreover provided with a plurality of hinges of fan cowls 34, said hinges being preferably arranged at each of the two lateral longerons of the cradle, arranged on either side of the median vertical and longitudinal plane. Each of these two longerons 50 thus bears a plurality of hinges 48 connected to one of the fan cowls 34 of the nacelle. In the example shown in FIG. 3, the hinges 48 provided on each longeron 50 are for example three in number, oriented along a same cowl hinge axis.

In addition, FIG. 3 shows that the fore aerodynamic structure 24 extends preferably along the direction X over a length identical or similar to that of the fan cowls 34 (only one of the two cowls being represented in this figure).

Returning to FIG. 2, it may be noticed that the fore aerodynamic structure 24, the cradle 40 and the fairing 46, which have been represented in a schematic manner, are lacking any direct mechanical link with the rigid structure 8 situated at a distance towards the aft and downwards with respect to said structure 24. On the other hand, the fillet 28 incorporates at its fore end a span 60 on which the aft end of the cradle 40 is able to rest, in certain conditions that will now be detailed. In this respect, it is indicated that the span 60 is indeed integral with the fairing 28, but could also be an extension of the primary structure 8. According to yet another alternative, the span 60 could be integral with the fan housing 18.

Figure 4A:
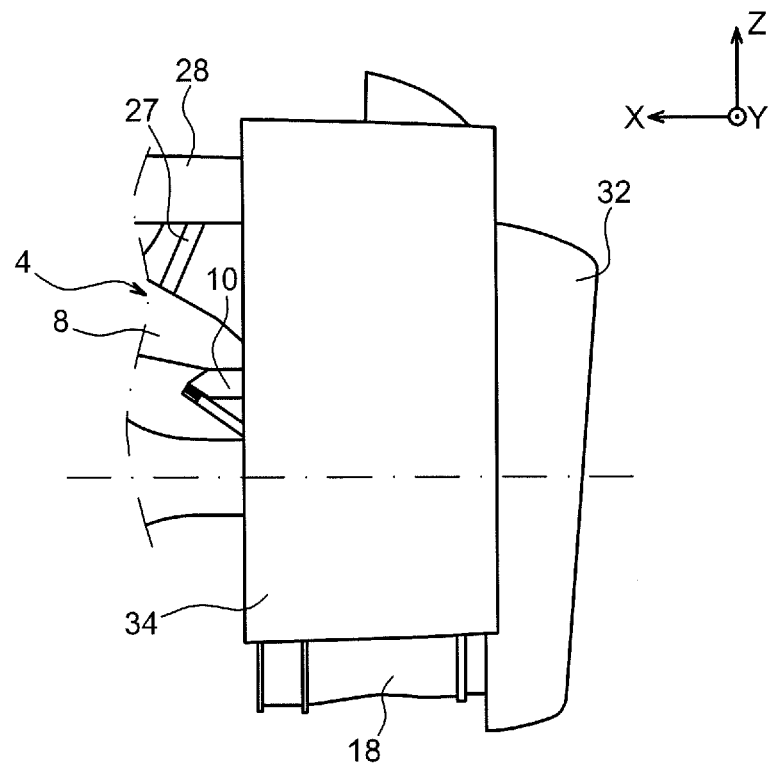
FIG. 4a represents a partial side view of the engine assembly shown in the preceding figures, with the fan cowls in open position.
Figure 4B:
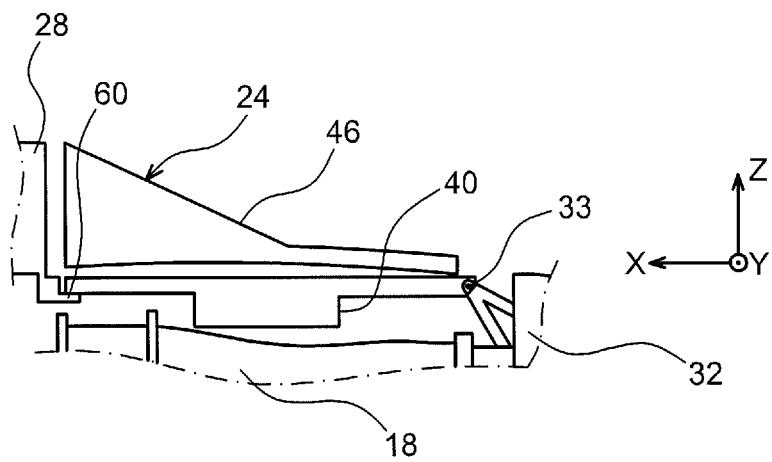
FIG. 4b represents an enlarged side view of the cradle, in its first configuration adopted when the fan cowls are in open position.

FIG. 4b shows the cradle 40 in a first configuration, adopted when the fan cowls 34 are in open position, as has been represented in FIG. 4a. In this first configuration, the cradle 40, pivot mounted at its fore end by means of hinges 33, is retained at its aft end by the span 60 raised with respect to the fan housing 18. It is preferably a simple support by gravity of the aft end of the cowl on the span 60, of transversal width for example identical or similar to that of the cradle. Other means could be used to assure the retaining of the aft end of the cradle, such as a spring system or similar enabling the suspension of the aft end from the span 60.

This first configuration is adopted on the ground, in particular during maintenance operations requiring the opening of the fan cowls 34.

Figure 5A:
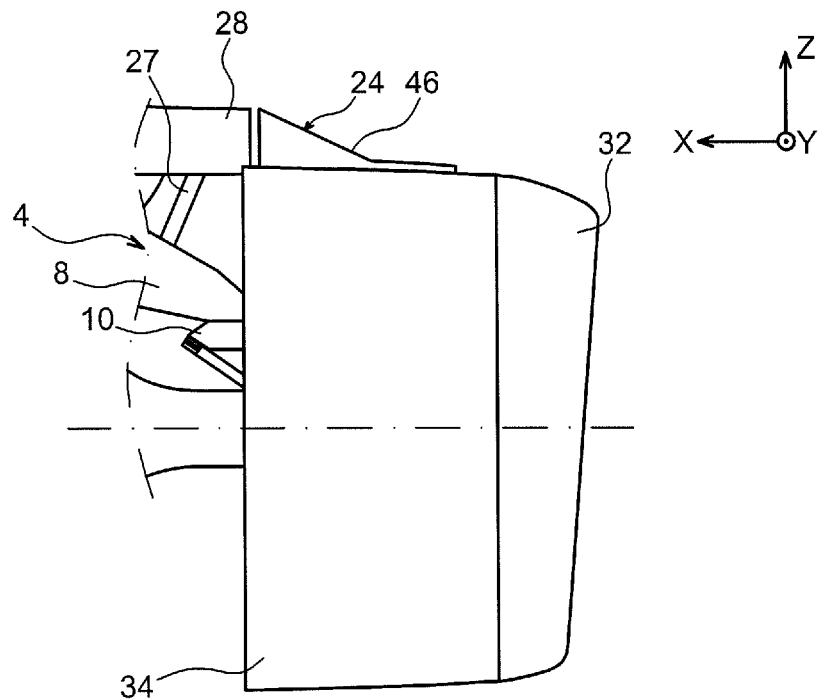
FIG. 5a represents a partial side view of the engine assembly shown in the preceding figures, with the fan cowls in closed position.
Figure 5B:
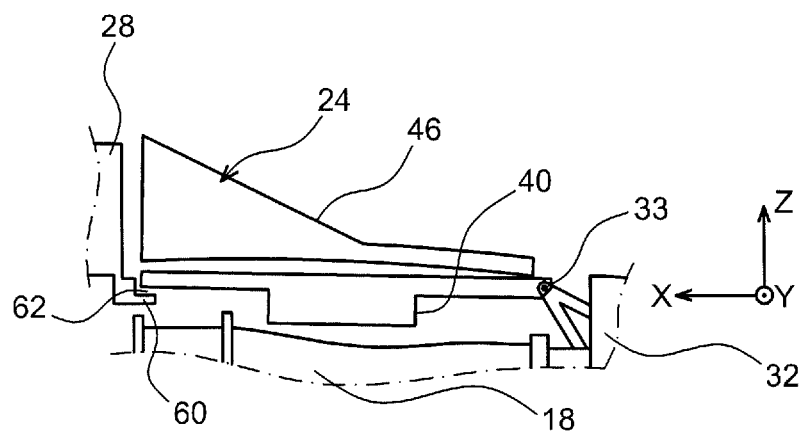
FIG. 5b represents an enlarged side view of the cradle, in its second configuration adopted when the fan cowls are in closed position.
Figure 6:
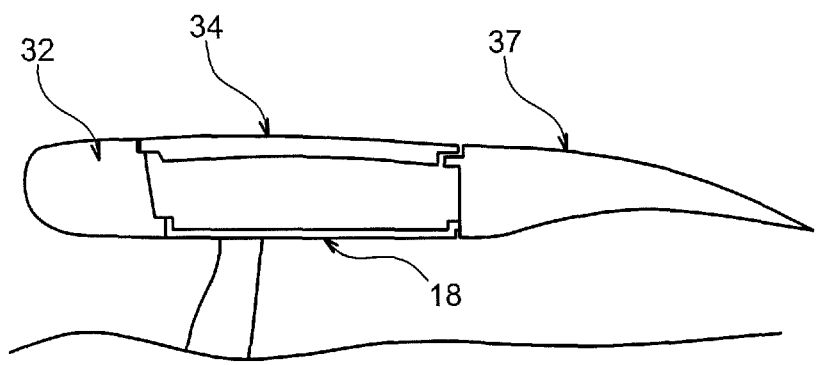
FIG. 6 represents a schematic sectional view showing one of the fan cowls in closed position, supported by the air intake and the thrust reverser system.

When said cowls 34 are in closed position represented in FIG. 5a, locked together in the lower part, they are then supported at the fore end thereof by the air intake 32, and supported at the aft end thereof by a thrust reverser system 35 equipping the engine, as may be seen schematically in FIG. 6. In order to limit the degree of hyperstaticity in which is found each of the two fan cowls, it is provided that the cradle 40 here adopts a second configuration shown in FIG. 5b, in which its aft end is no longer in contact with the span 60. In a more general manner, in order to limit the stresses on the nacelle elements, in particular on the cowls 34 thereof, the cradle is then lacking any direct mechanical link with the remainder of the engine mounting structure, whether with the primary structure thereof or with the secondary structure thereof.

With respect to the first configuration, the cradle 40 has left its support on the span 60, by pivoting around the hinges 33. A vertical clearance 62 is then observed between the two elements 40 and 60. Nevertheless, said loss of support is compensated by the cowls 34 themselves, which, while being supported by the air intake and the thrust reverser system, make it possible to maintain in place the cradle 40 to which they are mechanically linked by the cowl hinges 48. Naturally, the support of the cradle 40 is also conferred by the hinges 33 on the air intake, said hinges remaining effectively active in the two configurations of the cradle.

The second configuration that has just been described makes it possible to mechanically decouple the cradle from the remainder of the engine mounting structure. This thus reduces the degree of hyperstaticity associated with the fan cowls, the subsistent deformations of which encountered during flight may be accompanied by the fore aerodynamic structure 24, and in particular by the cradle 40 thereof, without it being stressed at its aft end.

The passage from the first to the second configuration takes place automatically during the closing of the fan cowls, which sees the latter progressively increase their support on the air intake and the thrust reverser. In the same way, the passage from the second to the first configuration takes place automatically by gravity during the opening of said cowls, which sees the latter progressively reduce their support on the air intake and the thrust reverser. Moreover, it is provided that the cradle 40 is pivoted by a low angle between its first and its second configuration, said angle being for example comprised between 0.5 and 5°. This results in a low clearance amplitude, which makes it possible in particular to maintain a satisfactory aerodynamic continuity between the fore structure 24 and the Karman 28, when the cradle adopts its second configuration.

Obviously, various modifications may be made by those skilled in the art to the invention that has been described uniquely as a non limiting example. In this respect, it may in particular be pointed out that if the engine assembly 1 has been presented in a configuration adapted for it to be suspended under the wing of the aircraft, said assembly 1 could also be in a different configuration enabling it to be mounted above said same wing, or even on an aft part of the fuselage of said aircraft.

The invention claimed is:

1. An engine assembly for an aircraft comprising an engine, a coupling device of the engine as well as a nacelle surrounding the engine and provided with fan cowls as well as an air intake, the coupling device comprising a rigid structure as well as a fore aerodynamic structure, the latter having a cradle equipped with an aerodynamic cowling, the cradle being hinge mounted at its fore end on an entity comprising a fan housing of the engine as well as the air intake, and the fan cowls being mounted to move on the cradle so as to be able to occupy an open position and a closed position in which they are supported at the fore by the entity and at its aft by a thrust reverser system, the cradle comprising a first configuration in which the fan cowls are in the open position and an aft end of the cradle is retained by a span of an engine mounting structure, and a second configuration in which the fan cowls are in the closed position and the cradle lacks any direct mechanical link with the other elements of the engine mounting structure.

2. The engine assembly according to claim 1, characterised in that the cradle is hinge mounted at the fore end on the entity, along a hinge axis parallel to a transversal direction of the assembly.

3. The engine assembly according to claim 1, wherein the span of the engine mounting structure is integral with a secondary structure of the engine mounting structure.

4. The engine assembly according to claim 1, wherein the cradle is pivoted by an angle approximately between 0.5 and 5° between the first and the second configuration, around its hinge with the entity.

5. The engine assembly according to claim 1, wherein the cradle is hinge mounted at the fore end on the air intake.

6. The engine assembly according to claim 1, wherein the cradle and the aerodynamic cowling are made from a single part.

7. The engine assembly according to claim 1, wherein in the second configuration, the aerodynamic cowling of the fore aerodynamic structure lies in an aerodynamic extension of another aerodynamic cowling of the engine mounting structure.

8. The engine assembly according to claim 1, wherein each fan cowl is hinge mounted on the cradle by at least two hinges.

9. The engine assembly according to claim 1, wherein in the first configuration the aft end of the cradle rests on the span of the engine mounting structure.

10. An aircraft comprising at least one engine assembly according to claim 1, assembled on a wing or on an aft part of a fuselage of the aircraft.

* * * * *